United States Patent [19]

Taylor

[11] Patent Number: 5,721,461
[45] Date of Patent: Feb. 24, 1998

[54] COMBINED ENERGY STORAGE ALTERNATOR AND PULSED POWER ALTERNATOR

[75] Inventor: Robert Joseph Taylor, Arlington, Tex.

[73] Assignee: Lockheed Martin Vought Systems, Grand Prairie, Tex.

[21] Appl. No.: 792,865

[22] Filed: Jan. 31, 1997

[51] Int. Cl.$^6$ .................................................. H02K 37/00
[52] U.S. Cl. ............... 310/268; 310/74; 310/113; 310/114; 74/572
[58] Field of Search ............... 310/74, 113, 268, 310/114; 74/572, 573, 574; 428/65

[56] References Cited

U.S. PATENT DOCUMENTS

| | | | |
|---|---|---|---|
| 4,065,189 | 12/1977 | Sikorra | 308/10 |
| 4,211,945 | 7/1980 | Tawse | 310/112 |
| 4,371,801 | 2/1983 | Richter | 310/156 |
| 4,444,444 | 4/1984 | Benedetti et al. | 308/10 |
| 4,511,190 | 4/1985 | Caye et al. | 308/10 |
| 4,578,609 | 3/1986 | McCarty | 310/156 |
| 4,578,610 | 3/1986 | Kliman et al. | 310/156 |
| 4,617,507 | 10/1986 | Eisenhaure et al. | 322/4 |
| 4,935,708 | 6/1990 | Weldon et al. | 322/62 |
| 4,945,811 | 8/1990 | Grieb | 89/8 |
| 4,996,457 | 2/1991 | Hawsey et al. | 310/268 |
| 5,016,600 | 5/1991 | Hilal | 124/3 |
| 5,081,901 | 1/1992 | Kemeny et al. | 89/8 |
| 5,210,452 | 5/1993 | Pratap et al. | 310/12 |
| 5,285,699 | 2/1994 | Walls et al. | 74/572 |
| 5,334,898 | 8/1994 | Skybyk | 310/268 |
| 5,396,140 | 3/1995 | Goldie et al. | 310/268 |
| 5,514,923 | 5/1996 | Gossler et al. | 310/74 |
| 5,530,309 | 6/1996 | Weldon | 310/178 |
| 5,619,087 | 4/1997 | Sakai | 310/268 |

*Primary Examiner*—Thomas M. Dougherty
*Assistant Examiner*—Timothy A. Williams
*Attorney, Agent, or Firm*—Sidley & Austin

[57] ABSTRACT

An alternator includes a flywheel for storing kinetic energy. A motor generator, which includes permanent magnets mounted to a rotor, receives electrical power for accelerating the rotor to a high rotational velocity to store kinetic energy. The rotor is provided with coils, and each coil is connected to first and second conductors. The exterior portion of the rotor comprises the flywheel. Stator coils are mounted adjacent to coils of the rotor and electrical power is produced within the stator coils. The kinetic energy stored in the rotor flywheel can be transformed to electrical power through a first output which is the coils of the motor generator and can produce a second electrical output through the stator coils of the alternator. The primary application of such a dual power alternator is to produce a high power pulse for an electromagnetic gun, and to also provide averaging power to supplement the power from the main drive engine of a vehicle.

3 Claims, 7 Drawing Sheets

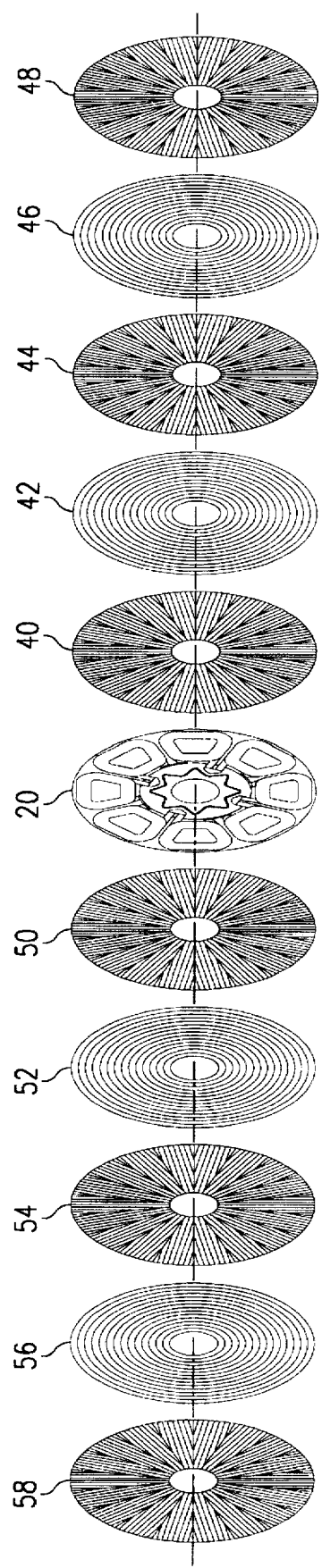
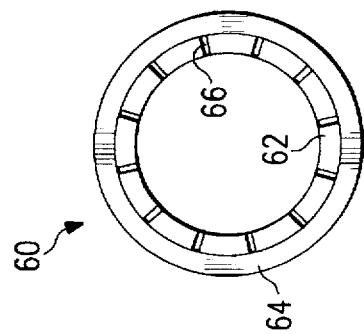
FIG. 2
FIG. 3

COMBINED ENERGY STORAGE ALTERNATOR AND PULSED POWER ALTERNATOR

TECHNICAL FIELD OF THE INVENTION

The present invention pertains in general to alternators for producing electrical power and in particular to such alternators which are used for producing pulsed power for electromagnetic guns and energy storage flywheels for surge power output.

BACKGROUND OF THE INVENTION

Electromagnetic projectile launchers, also referred to as "rail guns", have been described in numerous patents including U.S. Pat. No. 5,081,901 entitled "Electromagnetic Launcher With Muzzle Velocity Adjustment." An electromagnetic gun launches a projectile through a barrel by the use of electrical power. Such projectiles can be accelerated to very high velocities. However, the power and effectiveness of such electromagnetic guns depends upon generating extremely high power electrical pulses. One such device is a homopolar generator as shown in U.S. Pat. No. 5,081,901, and in U.S. Pat. No. 5,530,309.

Substantial problems are encountered when it is desired to fit an electromagnetic gun to a vehicle. The vehicle itself must have power to operate and there must be included within the vehicle a source of power for producing the intense energy pulses required for the electromagnetic gun. Serious size and weight problems arise in attempting to incorporate an electromagnetic gun in a vehicle. Thus, there is a need for an improved source of electrical power to reduce the constraints imposed upon a vehicle which carries an electromagnetic gun.

SUMMARY OF THE INVENTION

A selected embodiment of the present invention is a dual power alternator which produces electrical power through two different output lines. The alternator includes a plurality of planar disks which are combined together to form a rotor. Each disk includes an interior ting of permanent magnets, first and second planar conductors, and a plurality of planar coils, each having a first terminal connected to the first planar conductor and a second terminal connected to the second planar conductor. Each disk further includes an integral, planar flywheel which is exterior to the planar coils. The alternator includes a shaft which supports the rotor for rotation about the shaft. A first set of stator coils are mounted adjacent to the shaft wherein they interact with the permanent magnets to form a motor generator. When the first set of stator coils receives electrical power, rotation of the rotor is produced by the operation of the motor generator. A second set of stator coils are provided which are mounted adjacent to the planar coils of the rotor and function to produce electrical power due to the relative motion of the coils within the rotor with respect to the second set of stator coils. The components of the alternator including the rotor, shaft, permanent magnets and first and second stator coils are enclosed within a housing. A first electrical power output is derived from the alternator through the first stator coils which comprise the coils of the motor-generator. A second electrical power output is derived through the second set of stator coils due to the rotation of the planar flywheels of the rotor.

BRIEF DESCRIPTION OF THE DRAWINGS

For a more complete understanding of the present invention and the advantages thereof, reference is now made to the following description taken in conjunction with the accompanying drawings in which:

FIG. 2 is an illustration of the multiple layers which comprise a disk in accordance with the present invention, FIG. 3 is an illustration of a hub assembly for inclusion in the disk illustrated in FIG. 2.

DETAILED DESCRIPTION

The present invention is an alternator for providing multiple electrical power outputs from kinetic energy stored in a rotating flywheel. A primary application is for the generation of a pulse for an electromagnetic gun.

Figure 1:
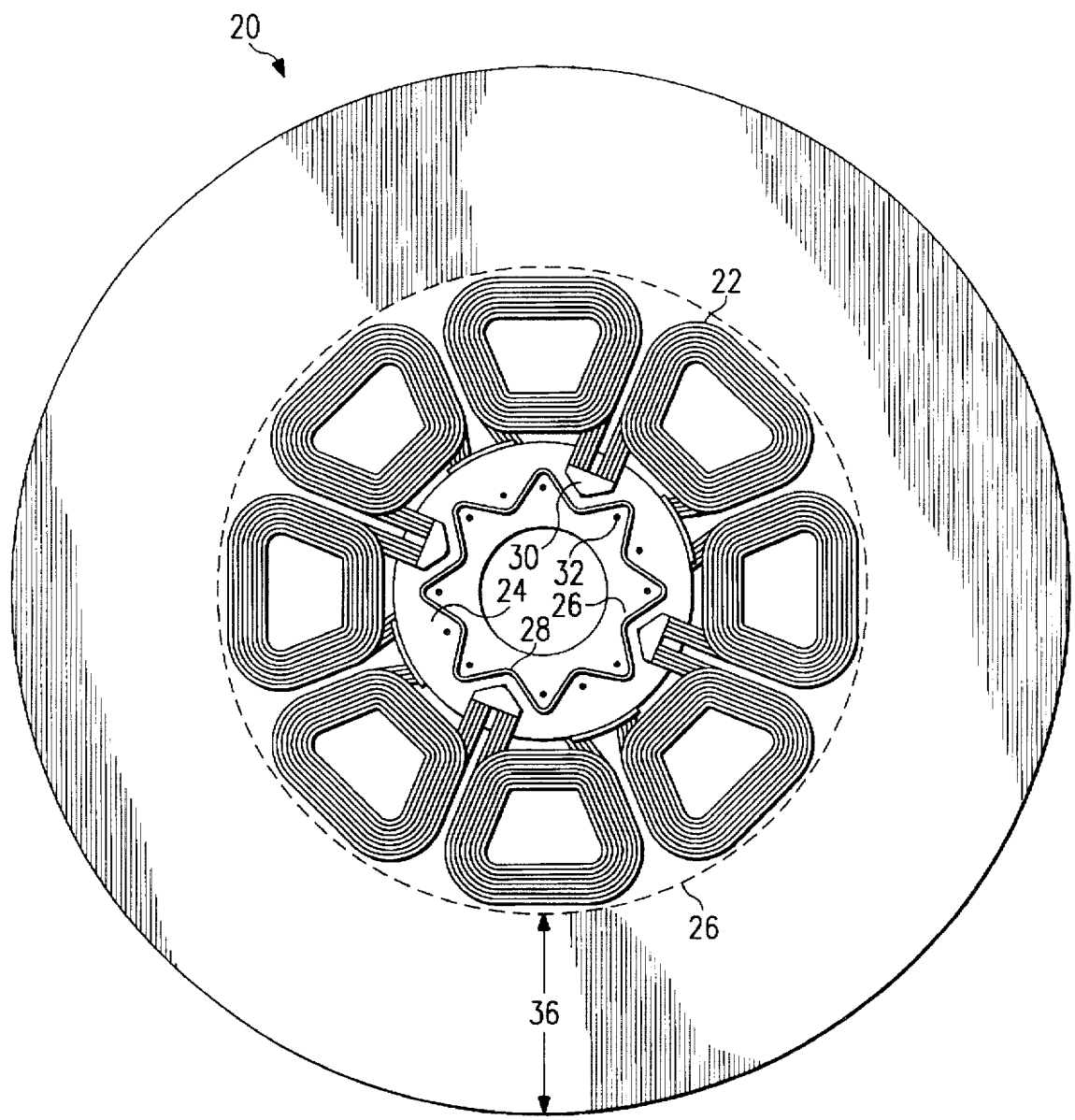
FIG. 1 is a plan view of a disk having coils and a peripheral flywheel in accordance with the present invention.

Referring to FIG. 1, there is illustrated a central layer 20 of a disk in accordance with the present invention. The body of the layer 20 comprises high strength material, such as fiber embedded with epoxy. Within the body of the layer there are embedded eight coils, one of which is coil 22. All of the coils are embedded within the fiber and epoxy. At the center of the layer 20 there are two planar conductors 24 and 26 which are separated by a groove 28. The conductors 24 and 26 are a layer of copper which has been etched with the groove 28 to electrically isolate the conductors. A first terminal of coil 22 is connected to the first conductor 24 at a connector 30. The second terminal of coil 22 is connected to the second conductor 26 at a connector 32. Each of the coils within the layer 20 has a corresponding pair of terminals connected to the conductors 24 and 26.

The outer periphery of the layer 20 comprises a flywheel 36 which likewise comprises high strength material such as fibers and epoxy.

Referring to FIG. 2, there is shown an expanded view of a disk in accordance with the present invention. The disk includes at its center the layer 20 as shown in FIG. 1. Five additional layers 40, 42, 44, 46 and 48 are on one side of the layer 20 with additional layers 50, 52, 54, 56 and 58 on the opposite side of the layer 20. Each of these additional layers also comprises high strength material such as fibers bound in epoxy. The layers 40, 44, 48, 50, 54 and 58 have radial oriented fiber plies while the layers 42, 46, 52 and 56 have circularly oriented fiber plies. All of the layers shown in FIG. 2 are bonded together with epoxy to form an integral unit.

Referring to FIG. 3, there is shown a hub assembly 60 which includes a plurality of permanent magnets, such as 62, each of which is in the form of an arc segment. Each of the permanent magnets is bonded to a ring 64. The permanent magnets are each separated by a spacer, such as 66.

Figure 4:
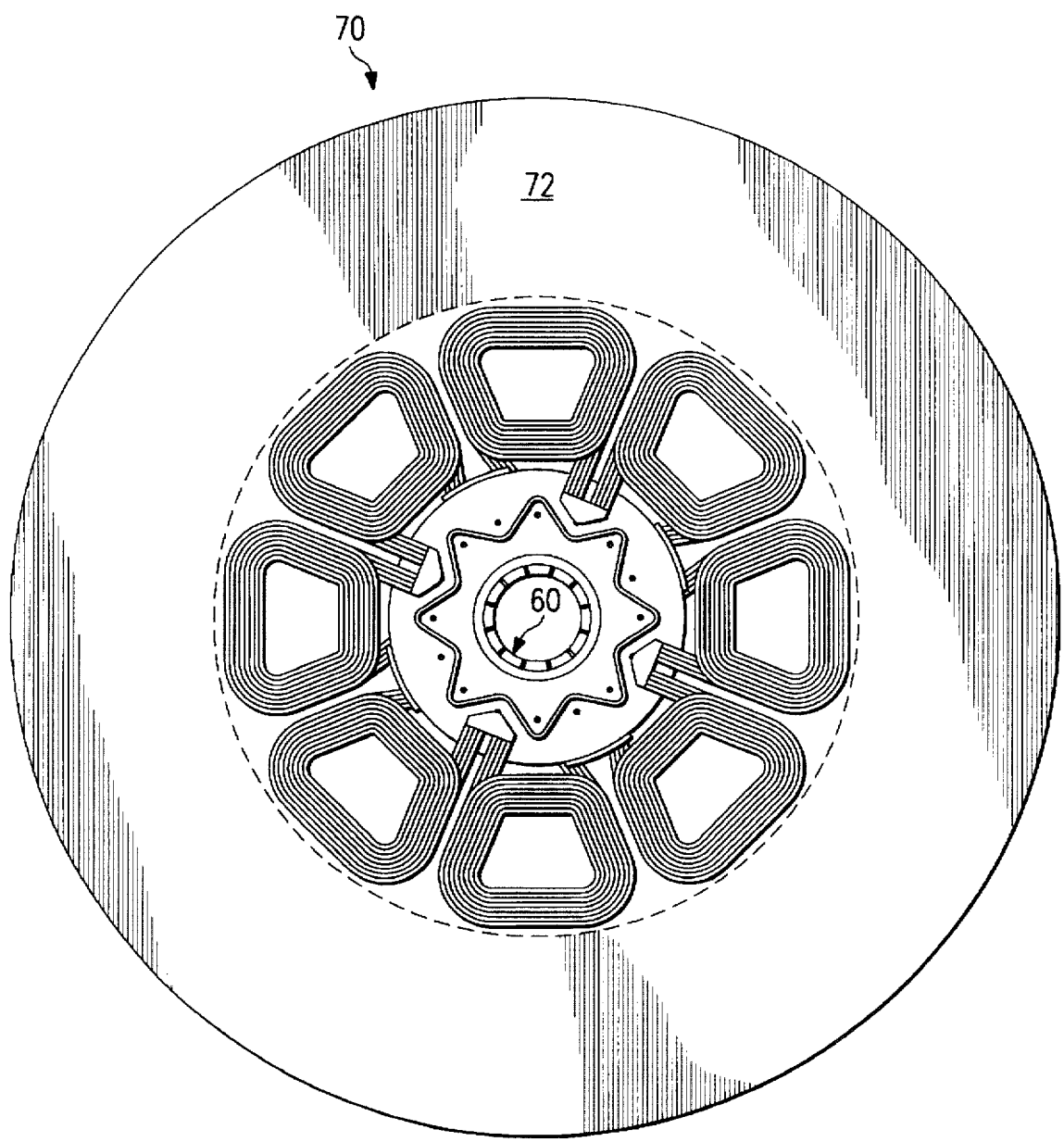
FIG. 4 is a plan view of a disk having the hub assembly installed therein.

A complete disk 70 in accordance with the present invention is shown in FIG. 4. The disk includes the composite of the layers shown in FIG. 2, together with the hub 60, shown in FIG. 3, which is installed coaxially on the interior of the layers. The outer portion of the disk 70 comprises a flywheel 72 made up of a plurality of layers of fiber and epoxy bonded together. The flywheel 72 is exterior of the coils which are within the disk 70.

A representative diameter for the coil assembly in disk 70 is 24 inches and the overall diameter of the disk is 40 inches, wherein the outer 16 inches comprises the flywheel.

Figure 5:
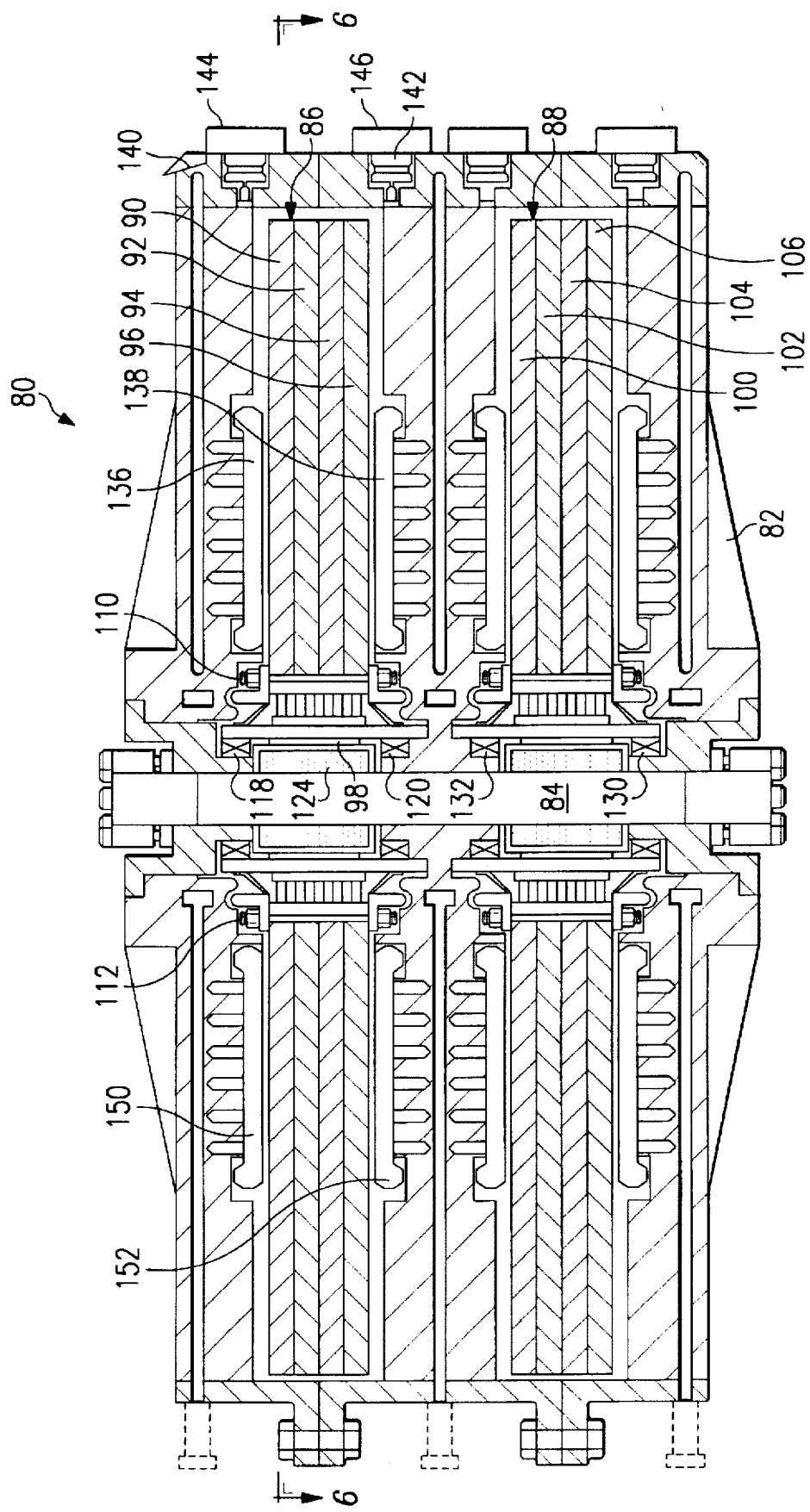
FIG. 5 is a section view of a dual power alternator, which has two rotors installed therein, in accordance with the present invention.

A group of the disks 70, such as shown in FIG. 4, are bonded together in groups to form a rotor as shown in FIG. 5. This figure is a section view of a dual power alternator 80 in accordance with the present invention. The alternator 80 includes a multi segment housing 82 which has a central shaft 84.

The alternator 80 has included therein a first rotor 86 and a second rotor 88. The first rotor 86 has disks 90, 92, 94 and 96, each of which corresponds to disk 70 shown in FIG. 4. Rotor 88 includes disk 100, 102, 104 and 106. Each of these corresponds to the disk 70 shown in FIG. 4.

The disks 90, 92, 94 and 96 are bonded together across their full planar area and electrical contact between disks is maintained by bolts 110 and 112, together with corresponding nuts and similar bolts and nuts in a circular pattern about the rotor 86. The rotor 88 has a similar configuration, but it rotates in the opposite direction from that of rotor 86 to balance torques.

The rotor 86 is supported by bearings 118 and 120. Rotor 86 is supported by a sleeve 98.

Stator coils 124 are positioned to interact with the rotor permanent magnets, such as 62 shown in FIG. 3, to form a motor generator set.

The rotor 88 is supported by bearings 130 and 132.

The alternator 80 shown in FIG. 5 has first and second stator coils 136 and 138 which are positioned just offset from the coils within the respective disks 90 and 96. These coils have terminals connected respectively to rectifiers 140 and 142 which are connected to terminals 144 and 146.

There are further provided stator coils 150 and 152 which are also in a planar arrangement with the respective disks 90 and 96. These coils likewise have conductors connected to the terminals 144 and 146.

The rotor 88 has a similar configuration and corresponding stator coils as previously described for rotor 86.

Note in FIG. 5 that a very substantial portion of the external portion of each of the rotors 86 and 88 comprises a flywheel. This flywheel portion extends from the periphery of the coils to the outer edge of the rotor.

Further referring to FIG. 5, in operation, the alternator 80 receives electrical power at the stator coils, such as 124 for the disk 86 and the corresponding stator coil for the rotor 88. When power is supplied to these stator coils, they interact with the permanent magnets in the rotors to function as a motor and cause the rotors 86 and 88 to rotate and develop a sufficiently high rotation speed to store substantial kinetic energy within the rotor flywheels. After the rotors 86 and 88, which are rotating in opposite directions, have been accelerated to a sufficiently high velocity, electrical power can be removed from the alternator 80 through the stator coils, such as 124 and used to supply surge electrical power, primarily within a vehicle. Such storage of kinetic energy for producing electrical power can handle peak power requirements and use a much lower power prime engine, which could, for example, be a gas turbine or diesel engine.

An alternator similar to that shown in FIG. 5, but without the flywheel elements of the rotors, has been designed by Kaman Electromagnetics.

When a very high power pulse of power is needed, such as for powering an electromagnetic gun, this power is extracted from the stator coils such as 136 and 138 and output through the terminals 144 and 146. These stator coils interact with the coils within the rotor 86 to produce an extremely high power electrical pulse, which may be several mega amps of current. The coils within the rotor 86 are excited by power supplied through slip rings to the coils, and this is further described in FIG. 6. Thus, when a sudden pulse of electrical energy is needed to power an electromagnetic gun, this power can be obtained from the kinetic energy stored in the flywheels of the rotors 86 and 88 via the corresponding stator coils.

Therefore, it can be seen that the alternator 80 produces two electrical outputs, one through the stator coils associated with the motor generator and the other through the stator coils associated with the coils within the rotors, and both sources of power are provided by transforming the kinetic energy of the rotor flywheels to electrical energy.

Figure 6:
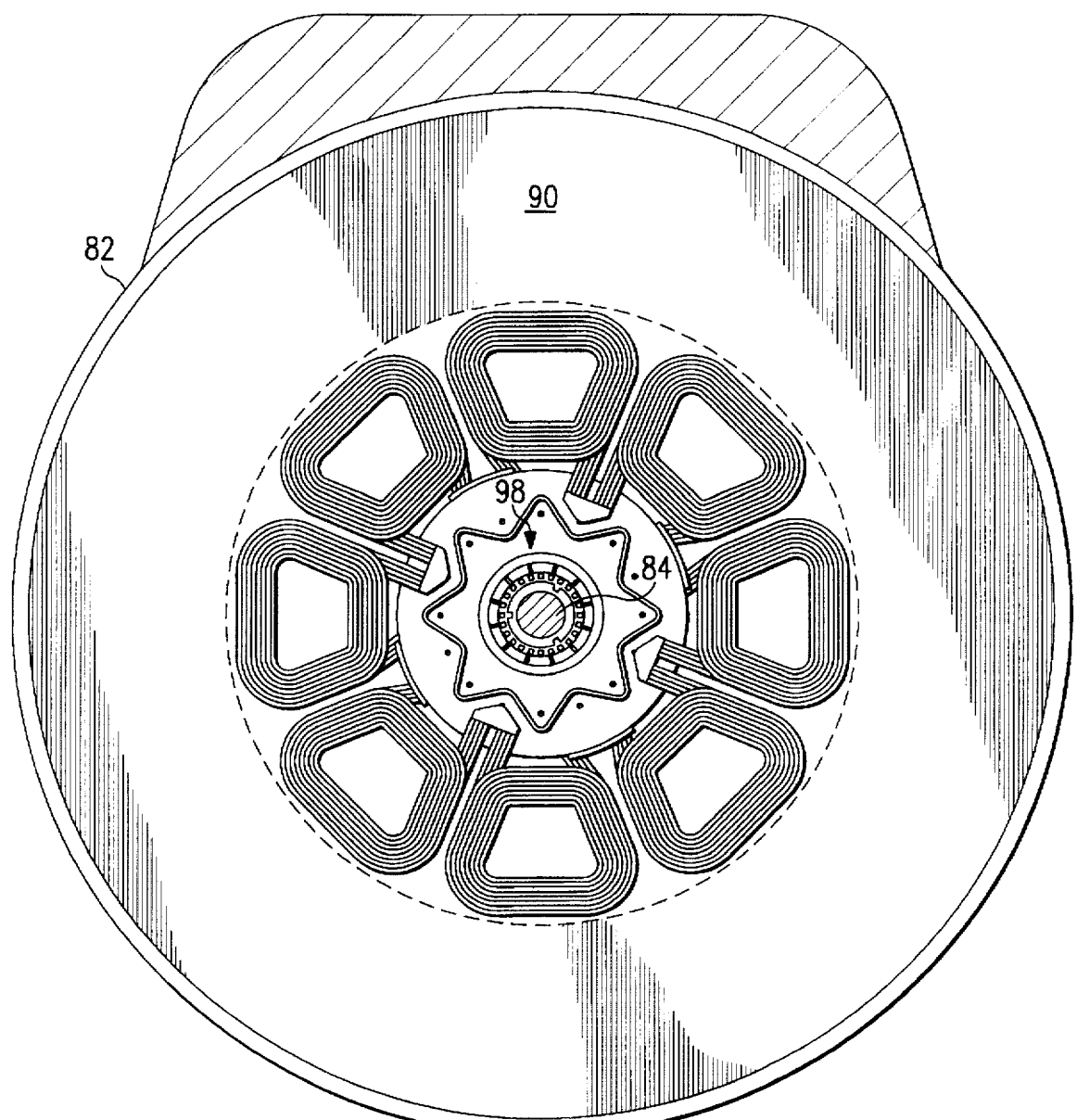
FIG. 6 is a section view of the alternator shown in FIG. 5.

FIG. 6 is a section view of the alternator 80 shown in FIG. 5.

Figure 7:
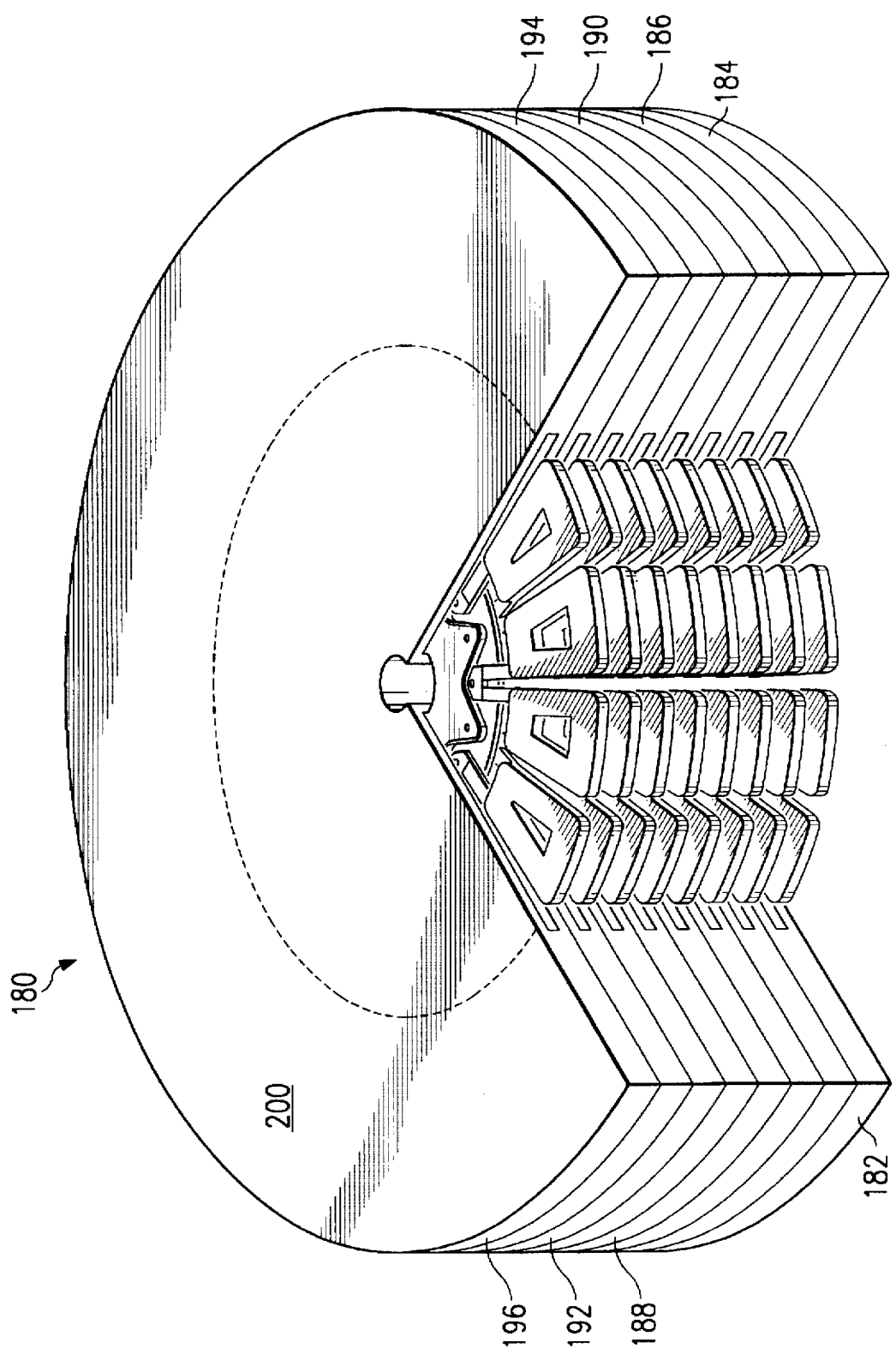
FIG. 7 is a cutaway view of a further rotor in accordance with the present invention.

Referring to FIG. 7, there is shown a further embodiment of a rotor 180 in accordance with the present invention. This rotor has eight layers 182, 184, 186, 188, 190, 192, 194 and 196. Each of these layers is provided with sixteen coils, as opposed to the eight coils shown in the layer 20 in FIG. 1. The rotor 180 includes a peripheral flywheel 200 which comprises the exterior portion of the multiple laminated layers. Thus, in accordance with the present invention the rotor can have any number of disks as required in the application and each disk can include any number of coils, as required by the particular application.

Figure 8:
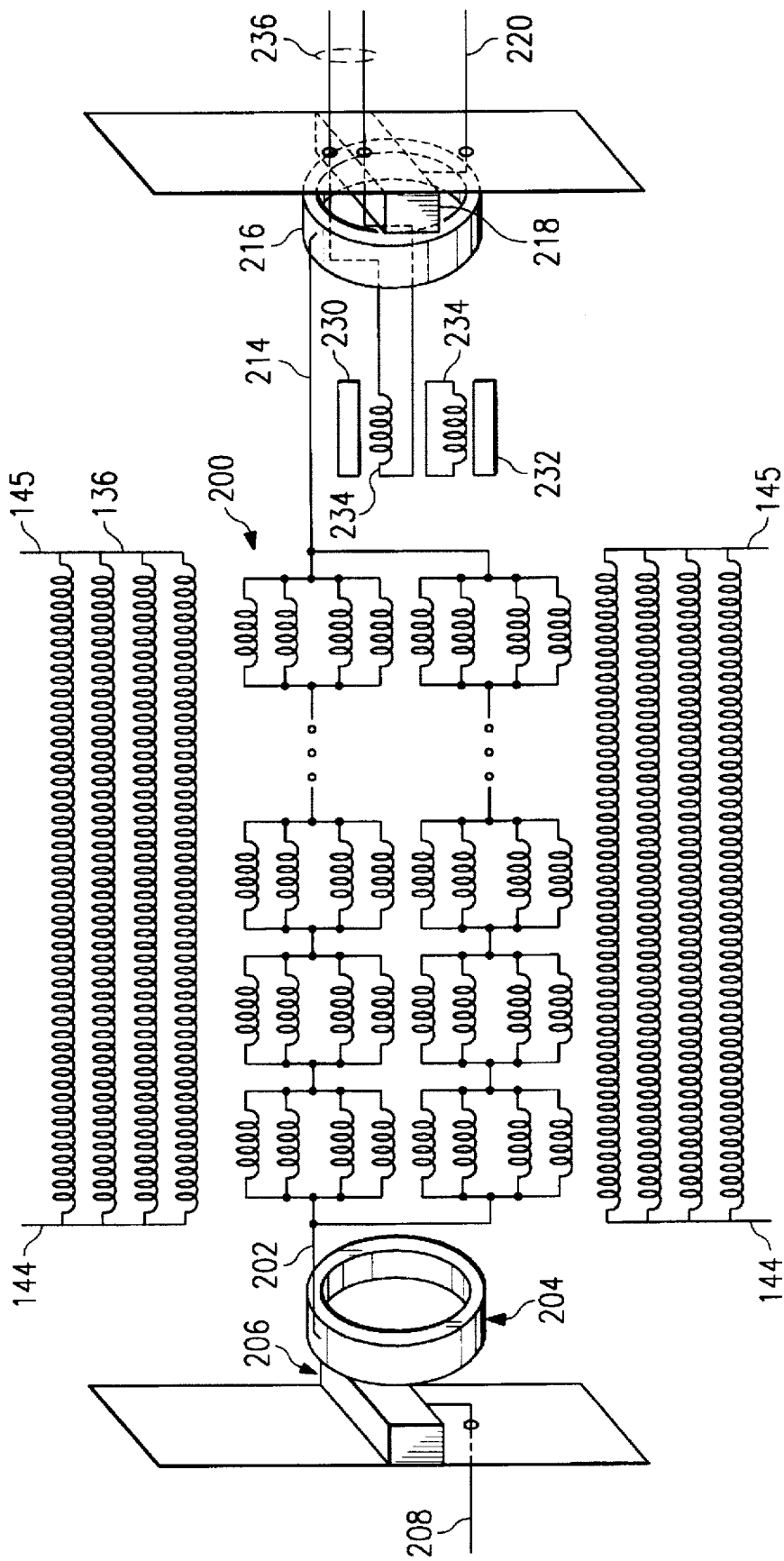
FIG. 8 is a schematic illustration of the electrical circuitry for the alternator shown in FIG. 5.

Referring now to FIG. 8, there is shown an electrical schematic diagram for the alternator 80 illustrated in FIG. 5. There is shown stator coils 136 with terminals 144 and 145. Mounted within the four disk rotor, such as 86, are coils 200, which correspond to the coils such as 22 within the layer 20 shown in FIG. 1. The coils 200 are connected through a first line 202 to a sliding contact ring 204 which is in electrical connection with a stationary brush contact 206 which is connected to a power line 208.

The coils 200 have a second line 214 which is connected to a sliding contact ring 216 which is electrically connected to a stationary brash contact 218. The contact 218 is connected to a power line 220.

There are further included permanent magnets 230 and 232 which correspond to the permanent magnet 62 shown in FIG. 3. The magnets 230 and 232 rotate with the rotor. Corresponding to the magnets 230 and 232 are stator coils 234 which are fixed with respect to the rotor. The combination of the magnets 230 and 232, together with the coils 234, comprises a motor generator which receives and provides power through lines 236.

In operation, referring to FIG. 8, electrical power is initially supplied from another source through the lines 236 to the coils 234 which then interact with the magnets 230 and 232 to accelerate a rotor, such as 86 shown in FIG. 5, up to a high rotational speed for storing energy in the corresponding flywheel. After the alternator 80 has the corresponding rotors spun up to operational speed, power can be extracted from the stored kinetic energy in two different ways. First, the coils 234 can be connected to a load so that the rotation of the magnets 230 and 232 with respect to the coils 234 produces electrical energy which is supplied through the lines 236. Power is typically extracted in this manner to supplement a vehicle's main power source, such as to provide greater acceleration for an electrically powered vehicle or to carry a temporary high power load. Power is extracted from the alternator 80 through the terminals 144 and 145 of the stator coils 136 principally to produce a very short time, intense energy pulse, such as for powering an electromagnetic gun. Such as pulse may have several mega amps of current for a brief time, such as a few milliseconds. Exciting current, received through lines 208 and 220, for the coil 200 can be supplied from the power lines 236.

Electrical power can be extracted from the moving rotors, such as 86 and 88 for so long as the rotors have sufficient kinetic energy. When additional energy needs to be stored in the rotors, power is again supplied through the lines 236 to the coils 234 to drive the magnets 230 and 232 to cause the corresponding rotor to again accelerate and rotate at a high rotational speed for storing kinetic energy.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A dual power alternator, comprising:
   a plurality of planar disks, each comprising an interior ring of permanent magnets, first and second planar conductors, a plurality of planar coils each having a first terminal thereof connected to said first planar conductor and a second terminal thereof connected to said second planar conductor and a planar flywheel exterior to said planar coils, wherein the plurality of said disks are joined together and aligned with a common axis to form a rotor,
   a shaft supporting said rotor for rotation of said rotor about said shaft,
   a first set of stator coils mounted adjacent said shaft wherein said first set of stator coils and said permanent magnets together comprise a motor generator, and wherein said first set of stator coils receives electrical power to cause rotation of said rotor by the operation of said motor generator,
   a second set of stator coils mounted adjacent said planar coils of said rotor for producing electrical power due to relative motion of said rotor with respect to said second set of stator coils,
   a housing for enclosing said rotor, said shaft, said permanent magnets and said first and second sets of stator coils, and
   wherein said first set of stator coils produces a first electrical power output due to kinetic energy stored in the rotation of said planar flywheels of said rotor and said second set of stator coils produces a second electrical power output due to kinetic energy stored in the rotation of said planar flywheels of said rotor.

2. A dual alternator as recited in claim 1 wherein said rotor has four disks.

3. A dual alternator as recited in claim 1 wherein the housing encloses pairs of said rotors rotating in opposite directions.

* * * * *